United States Patent [19]

Taga et al.

[11] Patent Number: 5,471,333
[45] Date of Patent: Nov. 28, 1995

[54] OPTICAL COMMUNICATION SYSTEM

[75] Inventors: Hidenori Taga, Sakado; Masatoshi Suzuki, Kawashima; Noboru Edagawa, Tokyo; Shu Yamamoto, Shiki; Hiroharu Wakabayashi, Kawasaki, all of Japan

[73] Assignee: Kokusai Denshin Denwa Kabushiki Kaisha, Tokyo, Japan

[21] Appl. No.: 125,428

[22] Filed: Sep. 22, 1993

[30] Foreign Application Priority Data

Sep. 25, 1992 [JP] Japan ................... 4-279158

[51] Int. Cl.⁶ .......................... H04B 10/00; H04B 10/12
[52] U.S. Cl. .................... 359/173; 359/161; 359/179; 359/341; 385/122
[58] Field of Search ......................... 359/111, 134, 359/153–154, 160–161, 173, 179, 188, 195, 341; 372/6; 385/122

[56] References Cited

U.S. PATENT DOCUMENTS

| | | | |
|---|---|---|---|
| 4,558,921 | 12/1985 | Hasegawa et al. | 359/160 |
| 5,035,481 | 7/1991 | Mollenauer | 359/188 |
| 5,185,827 | 2/1993 | Poole | 385/28 |
| 5,191,631 | 3/1993 | Rosenberg | 359/173 |

FOREIGN PATENT DOCUMENTS

| | | |
|---|---|---|
| 0554714A1 | 8/1993 | European Pat. Off. . |
| 2064161 | 6/1981 | United Kingdom . |
| 2007430 | 4/1992 | WIPO ..................... 359/188 |

Primary Examiner—Leo H. Boudreau
Assistant Examiner—Kinfe-Michael Negash
Attorney, Agent, or Firm—Emmanuel J. Lobato

[57] ABSTRACT

An optical transmission system is disclosed, in which the transmission of the optical soliton pulses is controlled by controlling the wavelength dispersion of the optical fiber transmission line for each long section including a plurality of optical amplifier repeaters. In this case, the first sections having an average value of the wavelength dispersion larger than the dispersion value meeting with the soliton condition and the second sections having an average value of the wavelength dispersion smaller than the dispersion value meeting with the soliton condition are alternatively allocated in the optical fiber transmission line, so that the average value of the wavelength dispersion of the entire length of the optical fiber transmission line assumes a positive value.

3 Claims, 4 Drawing Sheets

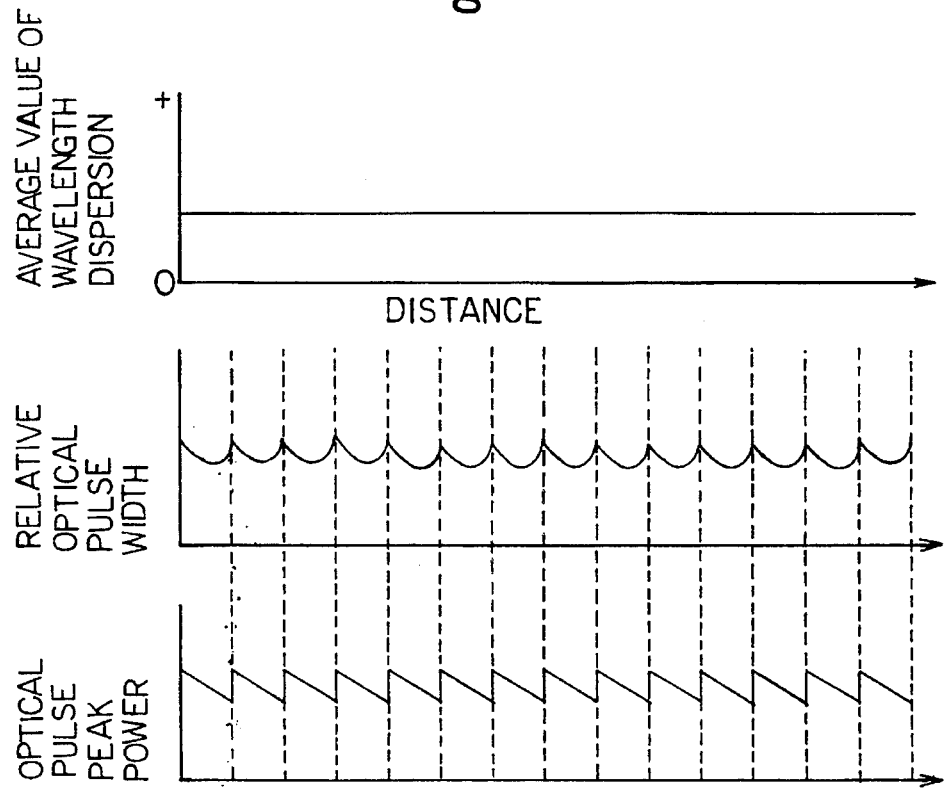

OPTICAL COMMUNICATION SYSTEM

BACKGROUND OF THE INVENTION

The present invention relates to transmission systems using optical fibers, and more particularly, to an optical communication system including a plurality of optical amplifiers for transmitting optical soliton pulses.

An optical fiber communication technique, ultra-long distance systems are now developing on the babe of a high-pace progress of the optical amplification technique, so that an optical transmission system over the Pacific Ocean can be realized without using any regenerative repeater. However,communication speed and capacity of the conventional optical communication system are limited since the transmission performance is degraded due to the wavelength dispersion characteristic and the nonlinear optical effect,as the communication speed becomes high. An optical soliton communication system has been closed up as a system capable of eliminating the limitation caused by the wavelength dispersion characteristic and the nonlinear optical effect. This optical soliton communication system is positively using the wavelength dispersion characteristic and the nonlinear optical effect,which are factors of the degradation of the transmission characteristic. The optical soliton pulses can be transmitted without deformation of the pulse shapes since the expansion of the pulse width due to the wavelength dispersion of the fiber is balanced with the reduction of the pulse width due to the nonlinear effect of the fiber. The optical communication system using such optical soliton pulses are now researched to realize a useful communication system because of many advantages,such as capability of large capacity,easiness of multiplexing and no additional deterioration by the nonlinearity of the optical fiber in comparison with a conventional optical communication system. In order to realize an ideal operation of the optical soliton pulses, it is essential that the optical fiber has no loss and the wavelength dispersion D and the soliton peak power $P_{sol}$ meet with the following equation (See a literature: L. F. Mollenauer et al., Journal of Lightwave Technology, Vol. 9, pp 194–197, 1991):

$$P_{sol} = 0.77 \frac{\lambda^3 A_{eff} D}{\pi^2 c n_2 \tau^2} \quad (1)$$

In this Equation (1), $\lambda$ is the wavelength of the optical signal; $A_{eff}$ the effective area of an optical fiber; c the light speed; $n_2$ the nonlinear coefficient of the optical fiber; $\tau$ the full width of the half maximum of the optical soliton pulse.

An actual optical fiber has the loss. Therefore, even if the peak power of the optical pulse and the wavelength dispersion are mutually balanced at the input end of the optical fiber, the effect of the wavelength dispersion increases as the optical pulse transits through the optical fiber, because the decrease of the peak power causes and the pulse broadening and disables the optical soliton pulse operation.

To compensate for this deterioration, a system called as a dynamic soliton transmission was proposed for a long-distance pulse optical soliton pulse transmission system (See: N. Nakazawa et al, IEEE Journal of Quantum Electronics, Vol. 26 pp 2095–2102, 1990),in which optical power loss is compensated for by the optical amplifiers and the peak power of the optical pulses at the input end of each optical fiber is reset to a value a little more than the power defined by each Equation (1).

In the dynamic soliton transmission system, the optical pulse width is compressed due to the effect of the nonlinearity of the optical fiber caused by the high peak power of the optical pulses at the initial portion of the optical transmission. However, at the end portion of the optical transmission where the power of the optical pulses are attenuated by the loss of the optical fibers, the pulse width is broadened by the effect of the wavelength dispersion of the optical fiber. To compensate for this pulse broadening, an optical amplifier can be inserted at a position where the pulse width is returned to the initial value so that the optical soliton pulse operation can be maintained in the optical transmission system. In this case,it is required that a section-average power meets with the condition defined in Equation (1). In FIG. 6, the relationship between the optical pulse width and the optical pulse peak power is described.

The wavelength dispersion in Equation (1) is defined as an average value in a transmission section, and the section length $Z_o$ is shorter than a length $Z_o$ defined by the following equation:

$$Z_0 = 0.322 \frac{\pi^2 c}{\lambda^2} \frac{\tau^2}{D} \quad (2)$$

In this Equation (2), D is an average value of the wavelength dispersion of the optical fiber of the transmission section; $\lambda$ the wavelength of the optical signal; c the light speed; $\tau$ the full width of the half maximum of an optical soliton pulse. A length $Z_o$ defined by Equation (2) is usually called as "soliton period". If the average value of the wavelength dispersion D of the optical fiber of the transmission section meets with the condition defined in Equation (1) and the section length $Z_o$ is sufficiently shorter than the soliton period $Z_o$, then the optical soliton pulse transmission can be performed.

In the dynamic soliton pulse transmission, the peak power of the optical soliton pulse is controlled so as to mutually equalize the pulse widths at the input end and the output end of the optical fiber, which are connected between adjacent two of the optical amplifiers. In this case, the average value of the wavelength dispersion should be maintained for each span of the optical fiber.

However,from the viewpoint of manufacturing deviation of the optical fiber, it is impossible to maintain the average value of the wavelength dispersion for each span of 30 Km to 50 Km in an ultra-long distance optical communication system, such as the Trans-Pacific System.

SUMMARY OF THE INVENTION

An object of the present invention is to provide a practical optical communication system in place of the conventional dynamic soliton transmission.

To attain the above object of the present invention,there is provided an optical communication system comprising:

an optical transmission terminal station for transmitting return-to-zero optical pulses including digital information;

an optical receiving terminal station for receiving the return-to-zero optical pulses;

an optical fiber connected between the optical transmission terminal station and the optical receiving terminal station; and a plurality of optical amplifier repeaters inserted in the optical fiber for compensating for the loss of the optical fiber transmission line;

said optical fiber and said plurality of optical amplifier repeaters forming an optical fiber transmission line;

an average value of wavelength dispersion on the entire length of the optical fiber transmission line being a positive value capable of compensating for the pulse compression effect and the pulse expansion effect on the optical pulses applied to the optical receiving terminal station;

first sections and second sections being alternately allocated in the optical fiber transmission line;

each of said first sections having an average value of the wavelength dispersion relatively larger than said average value of the wavelength dispersion on the entire length of the optical fiber transmission line;

each of said second sections having an average value of the wavelength dispersion relatively smaller than said average value of the wavelength dispersion on the entire length of the optical fiber transmission line.

In the optical transmission system of the present invention, the transmission of the optical soliton pulses is controlled by controlling the wavelength dispersion of the optical fiber transmission line for each long section including a plurality of optical amplifier repeaters. In this case, the first sections having an average value of the wavelength dispersion larger than the dispersion value meeting with the soliton condition and the second sections having an average value of the wavelength dispersion smaller than the dispersion value meeting with the soliton condition are alternatively allocated in the optical fiber transmission line, so that the average value of the wavelength dispersion of the entire length of the optical fiber transmission line assumes a positive value.

BRIEF DESCRIPTION OF THE ACCOMPANYING DRAWINGS

The present invention will be described in detail below with reference to accompanying drawings, in which:

FIG. 6 illustrates waveform diagrams explanatory of control operations of soliton pulses in a convention optical fiber transmission line.

PREFERRED EMBODIMENTS OF THE PRESENT INVENTION

Figure 1:
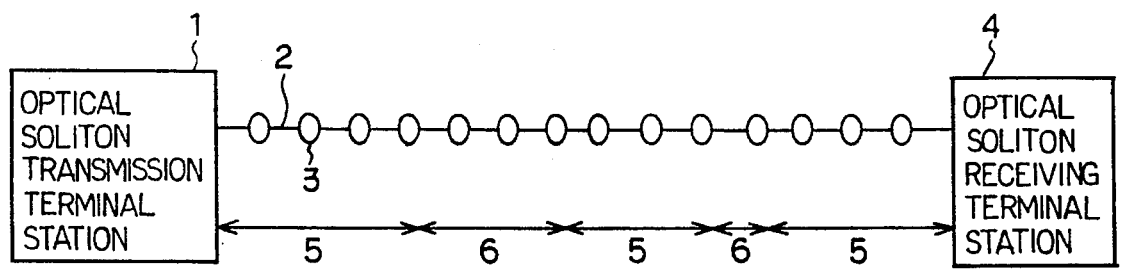
FIG. 1 is a connection diagram illustrating an optical fiber transmission line employed in the present invention.

With reference to FIG. 1, an optical transmission system of the present invention comprises an optical soliton transmission terminal station 1, an optical fiber 2, optical amplifier repeaters 3 for compensating for the loss of the optical fiber transmission line 2, and an optical soliton receiving terminal station 4. The optical fiber 2 and the optical amplifiers 3 form an optical fiber communication line. The optical fiber transmission line 2 comprises first sections 6 each having a relatively larger wavelength dispersion value and second sections 5 each having a relatively smaller wavelength dispersion value.

Figure 2:
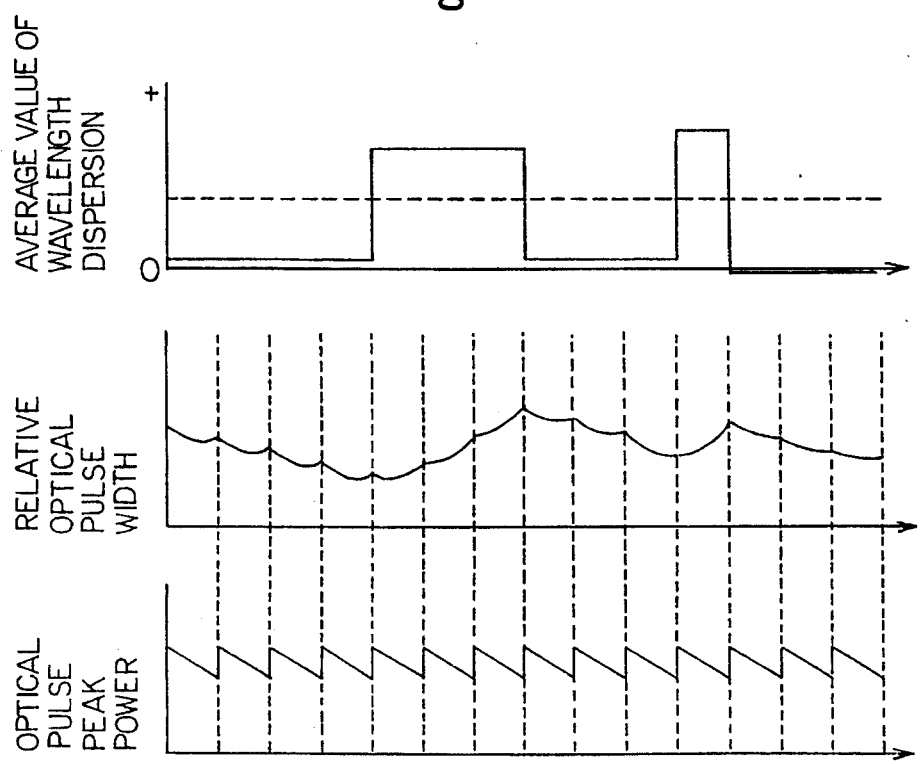
FIG. 2 illustrates waveform diagrams explanatory of control operations of soliton pulses in an optical fiber transmission line in accordance with the present invention.

FIG. 2 shows variations, in ordinate, of the wavelength dispersion value of the optical fiber, the optical pulse width and the peak power of the optical pulse, while the abscissa is a distance on the optical fiber from the transmission terminal station.

The waveform of each transmitted optical pulse is a $sech^2$ waveform essential for the optical soliton transmission. The average value of the waveform dispersion for the entire optical transmission line is a positive value, which can be compensated for pulse compression caused by Kerr Effect (nonlinear optical effect) of the optical fiber. Moreover, the first sections each having a relatively larger wavelength dispersion value and the second sections each having a relatively smaller wavelength dispersion value are alternately allocated, so that the average value of the waveform dispersion for the entire optical transmission line is established to meet with the condition where the pulse width of the transmitted optical pulse and the regenerated output of each optical amplifier repeater meet with the optical soliton condition in a macro sense. In one of the second sections each having a relatively smaller wavelength dispersion value, the nonlinear optical effect is mainly effective so that the optical pulses are slightly compressed in a macro sense.

In each fiber section between two optical amplifier repeaters, optical pulses injected to fiber section are pulse-compressed at the beginning of transmission by mainly effective nonlinear optical effect but the nonlinear optical effect is lowered due to light power attenuation as the optical pulses transmit through the fiber section, so the optical pulses are expanding a little by main effect of waveform dispersion in place of pulse compression or monotonously compressed. In any case, the optical pulses transmit through the fiber section under compression on an average. Therefore, the first section 6 having a larger wavelength dispersion value is connected. In this section 6, wavelength dispersion is mainly effective, so that pulse compression and pulse expansion are repeated in macro sense while the pulses are expanded in an average until the transmitted optical pulse is returned to the same pulse width as that of the injected optical pulse.

Figure 3A:
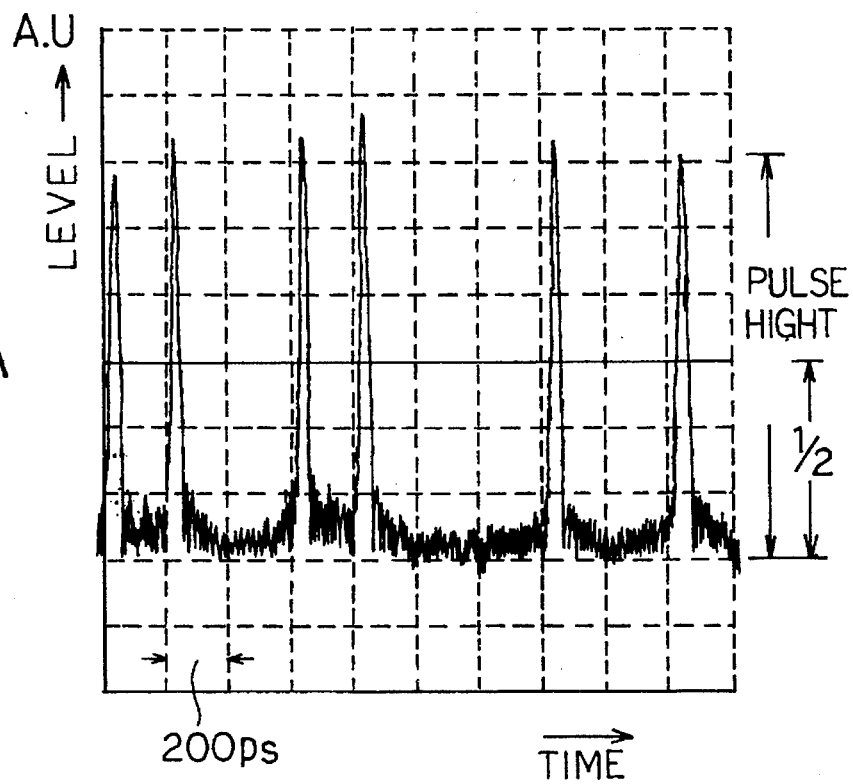
FIGS. 3A and 3B are waveform diagrams illustrating optical pulse waveforms transmitted in the optical fiber transmission line in accordance with the present invention.
Figure 3B:
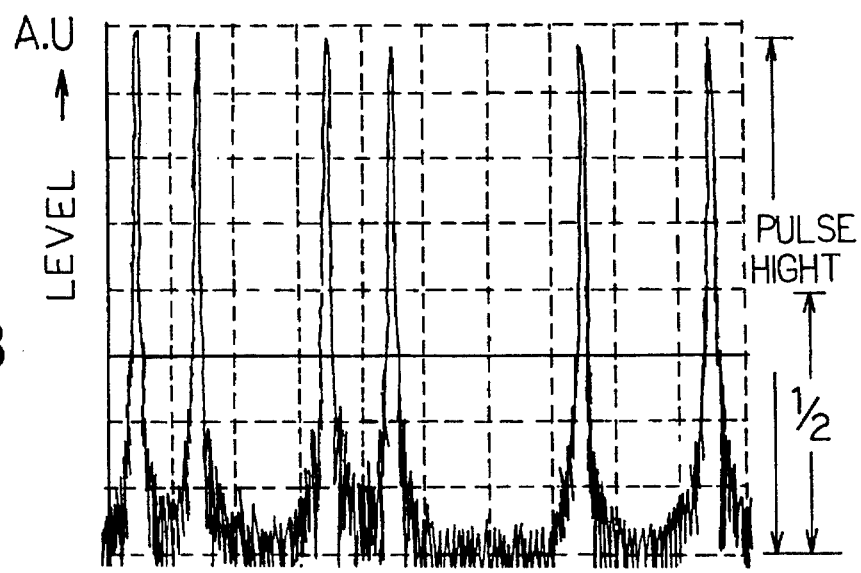
Figure 4:
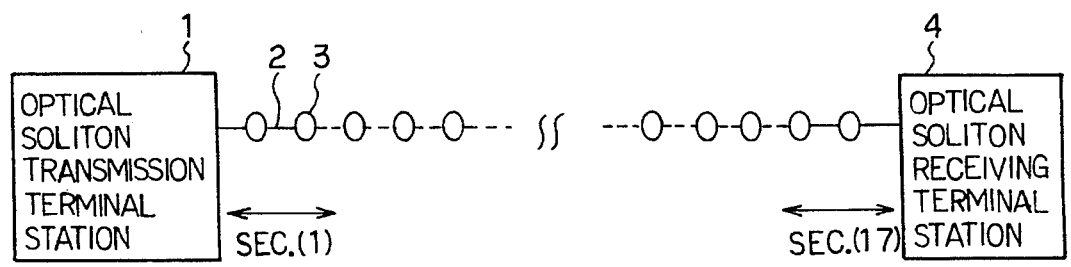
FIG. 4 is a connection diagram illustrating an embodiment of the present invention.

In the present invention, it is not necessary to restrictly control the wavelength dispersion value for each optical amplifier repeaters 3. Moreover, the length of the first section having a relatively larger wavelength dispersion value is not necessarily equal to the length of the second section having a relatively smaller wavelength dispersion value. Furthermore, allocation order of the first section and the second section can be optionally selected. As shown in FIG. 3A, the pulse width (width of half maximum: about 40 ps) of a pulse transmitted through the first section having a relatively larger wavelength dispersion value is expanded a little in comparison with that of an injected optical pulse. FIG. 3B shows a waveform of an optical pulse transmitted further through the second section having a relatively small wavelength dispersion value. The pulse width shown in FIG. 3B is narrower than that shown in FIG. 3A. It is understood that pulse control by average wavelength dispersion control can be performed in accordance with the present invention without strict wavelength dispersion control for each optical amplifier repeater in conventional dynamic soliton transmission. With reference to FIG. 4, an embodiment of the present invention comprises the optical soliton transmission terminal station 1, the optical fiber 2, the optical amplifier repeaters 3 and the optical soliton receiving terminal station 4. The optical fiber 2 and the optical amplifiers form an optical fiber communication line. Short optical pulses of oscillation wavelength 1.558 microns transmitted from the optical transmission terminal station 1 is modulated by a pseudo-random pattern at a transmission rate of 5 Giga-bits/second.

The optical amplifier repeaters 3 are allocated to a span of about 33 kilometers. The output power of each one of the optical amplifier repeaters 3 is set to a value of −4 dBm with a transmitting pulse width of 35 ps, while the average value of wavelength dispersion on the entire length 3000 kilometers of the optical fiber transmission line is set to a value of +0.4 ps/km/nm to meet substantially with the soliton transmission line comprises seventeen sections of different lengths,in which first sections having an average value of wavelength dispersion relatively larger than that of the entire length of the optical fiber transmission line and second sections having an average value of wavelength dispersion relatively smaller than that of the entire length of the optical fiber transmission line are alternately allocated.

Figure 5:
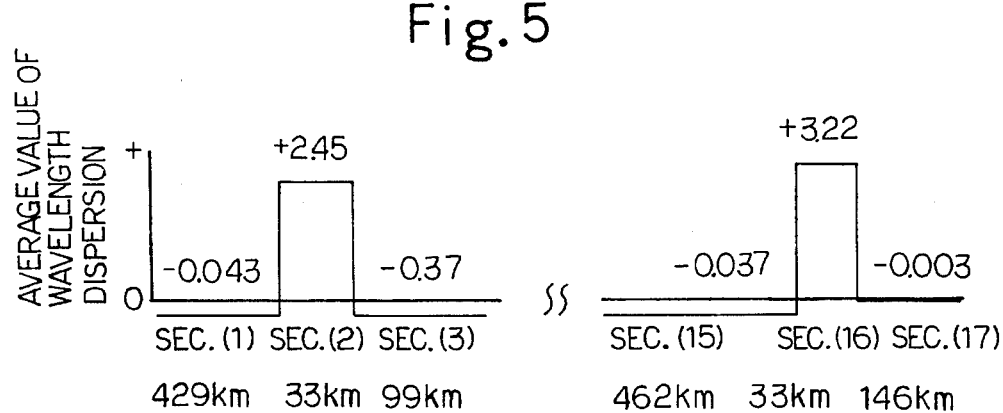
FIG. 5 is a characteristic diagram illustrating section wavelength dispersion values in the optical fiber transmission system of the present invention.

Second lengths and the section average wavelength dispersion values are shown on Table 1, while a part thereof is illustrated in FIG. 5.

TABLE 1

| Section No. | Section Length (km) | Average Dispersion Value (ps/km/nm) |
| --- | --- | --- |
| (1) | 429 | −0.043 |
| (2) | 33 | +2.45 |
| (3) | 99 | −0.37 |
| (4) | 66 | +2.36 |
| (5) | 66 | −0.86 |
| (6) | 66 | +2.27 |
| (7) | 429 | −0.076 |
| (8) | 66 | +2.06 |
| (9) | 297 | −0.068 |
| (10) | 33 | +3.85 |
| (11) | 462 | −0.043 |
| (12) | 33 | +2.45 |
| (13) | 247 | −0.079 |
| (14) | 33 | +1.82 |
| (15) | 462 | −0.037 |
| (16) | 33 | +3.22 |
| (17) | 146 | −0.003 |

Remarkable expansion or compression is not obsered on received waveforms after transmitting through the optical fiber transmission line of 3000 kilometers, and good transmission performance, such as a low error rate less than $10^{10}$ is achieved. It is therefore ascertained that optical soliton transmission can be stably accomplished in accordance with the present invention.

As mentioned above, stable optical soliton transmission is performed in this embodiment by controlling the wavelength dispersion value in view of an average of the wavelength dispersion value for a relatively long section, while the wavelength dispersion value is not controlled to be mutually equalized at the output of each one of the optical amplifier repeaters 3 as conventional dynamic soliton transmission.

In the present embodiment, the soliton transmission system has allocation order in which the second section having a relatively smaller average wavelength dispersion value and the first section having a relatively larger wavelength dispersion value are allocated in this order. However, this allocation order can be reversed.

The optical fiber transmission line can be formed by only a dispersion-shifted optical fiber having a zero-dispersion wavelength of about 1.55 microns or by including halfway conventional single-mode optical fiber (of zero dispersion wavelength: 1.3 microns) having a relatively larger wavelength dispersion.

The average wavelength dispersion value can be adjusted by insert-connecting, in optical fiber or an amplifier repeater, dispersion media which is embodied to obtain a positive wavelength dispersion by the Use of a conventional single-mode fiber etc.

As mentioned above, while high precision is required to each one of the optical amplifier repeaters and the optical fiber transmission line in the conventional dynamic soliton transmission because optical soliton pulses are controlled for each one of the optical amplifier repeaters in conventional technique. However, the system of the present invention is possible to compensate for manufacturing deviation of the optical fiber by controlling the allocation of sections of the optical fibers since the optical soliton pulse transmission is controlled in a lump for a plurality of fiber sections. Respective repeating sections of the wavelength dispersion values have more freedom of the design so that a stable optical transmission system can be constructed in accordance with the present invention. Therefore, the optical communication system of the present invention has a wider allowance for deviations of the wavelength dispersion value of the optical fiber and has remarkable merits for realizing a practical optical soliton transmission system.

What we claim is:

1. An optical communication system comprising:

an optical transmission terminal station for transmitting return-to-zero optical pulses representative of digital information;

an optical receiving terminal station for receiving said return-to-zero optical pulses;

an optical fiber transmission line connected for transmission of said optical pulses from said optical transmission terminal station to said optical receiving terminal station;

an optical fiber and a plurality of optical amplifier repeaters to amplify the optical pulses connected along the length of the optical fiber spaced from each other defining said optical fiber transmission line;

an average value of wavelength dispersion on the entire length of the optical fiber transmission line being a positive value effectively compensating for pulse compression effect and pulse expansion effect on the optical pulses applied to the optical receiving terminal station;

first sections and second sections of said optical fiber transmission line being alternately allocated along the length of the optical fiber transmission line;

each of said first sections having an average value of the wavelength dispersion relatively larger than said average value of the wavelength dispersion on the entire length of the optical fiber transmission line; and each of said second sections having an average value of the wavelength dispersion relatively smaller than said average value of the wavelength dispersion on the entire length of the optical fiber transmission line;

whereby the average value of the wavelength dispersion of the entire length of the optical transmission line effectively assumes said positive value.

2. An optical communication system according to claim 1, in which said first sections alternately precede successively said second sections along the length of said fiber transmission line starting from said optical transmission terminal.

3. An optical communication system according to claim 1, in which said second sections alternately precede successively said first sections along the length of said fiber transmission line starting from said optical transmission terminal.

* * * * *